April 14, 1936.  J. F. CHAPMAN  2,037,367
VEHICLE HEATING SYSTEM
Filed Aug. 26, 1933   2 Sheets-Sheet 1
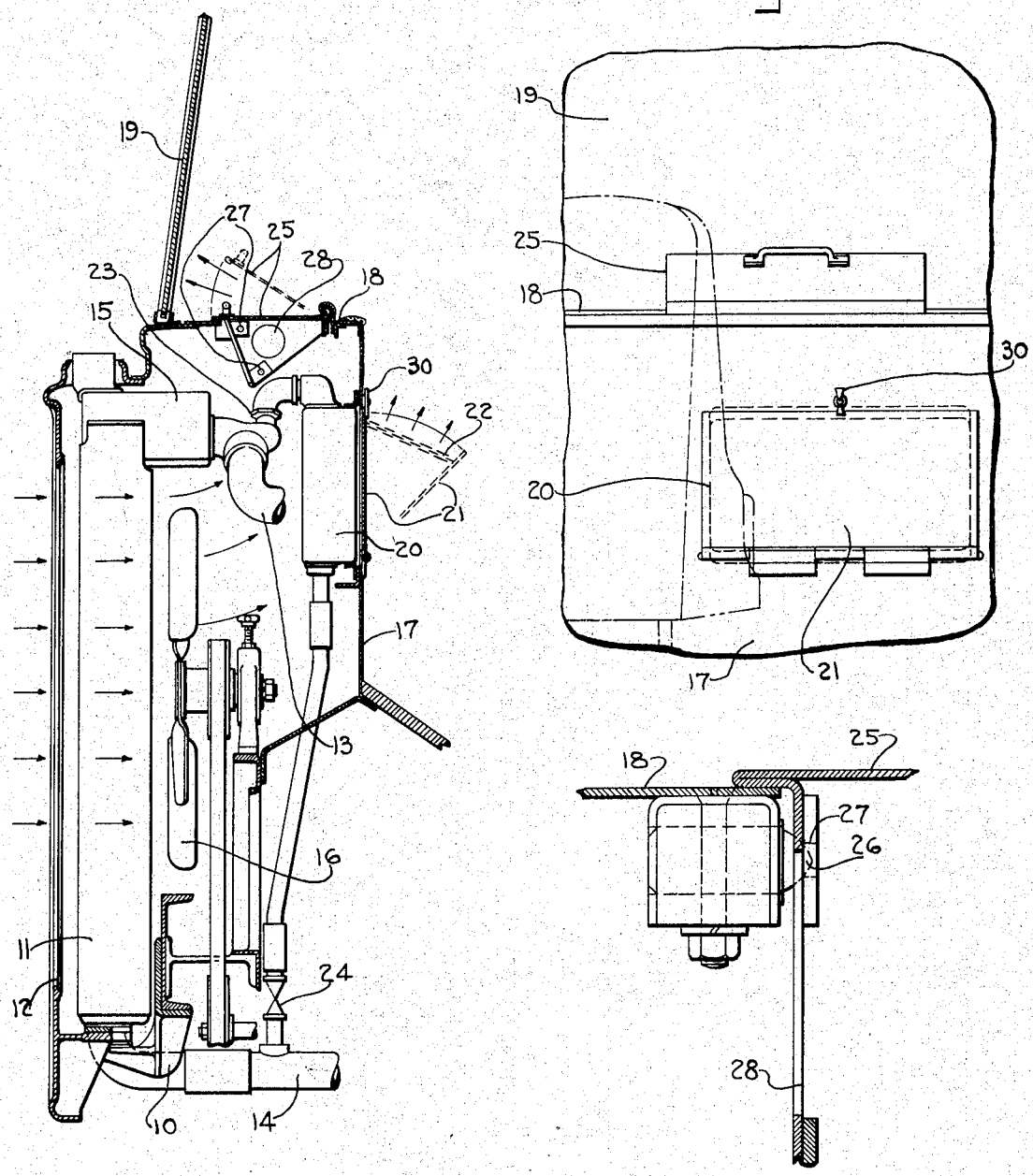
INVENTOR
JAMES F. CHAPMAN
BY J. H. Gibbs
ATTORNEY April 14, 1936. J. F. CHAPMAN 2,037,367
VEHICLE HEATING SYSTEM
Filed Aug. 26, 1933 2 Sheets-Sheet 2
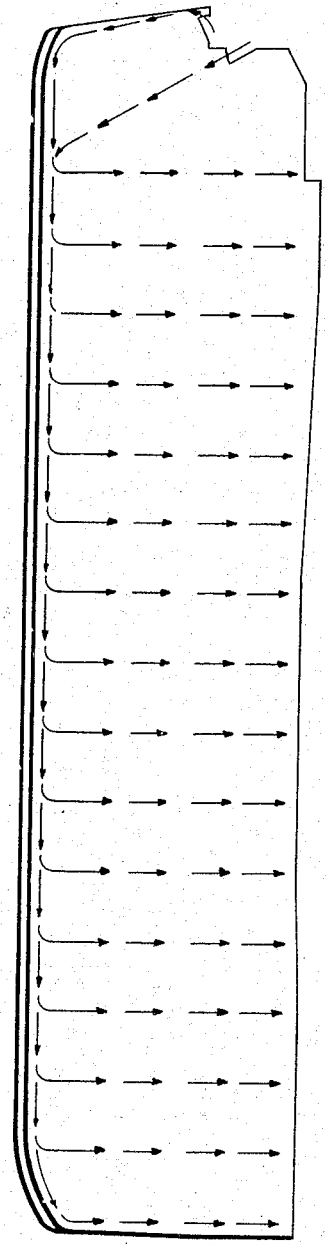
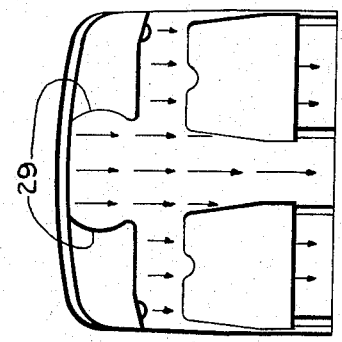
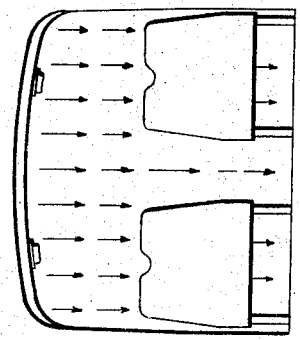
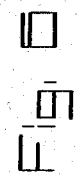
INVENTOR
JAMES F. CHAPMAN
BY J. H. Gibbs
ATTORNEY Patented Apr. 14, 1936

2,037,367

UNITED STATES PATENT OFFICE 2,037,367

VEHICLE HEATING SYSTEM

James F. Chapman, Upper Darby, Pa., assignor to American Car and Foundry Motors Company, New York, N. Y., a corporation of Delaware Application August 26, 1933, Serial No. 686,897

3 Claims. (Cl. 237—12.3)

The invention relates generally to heating systems and more particularly to heating systems for vehicles.

An object of the invention is to provide for conditioning the air discharged from a cooling system of an internal combustion engine to bring it to a desired temperature at which it may be utilized efficiently for heating vehicles to comfortable temperatures for passengers.

Another object of the invention is to provide for circulating heated air in a vehicle in a manner to heat all parts of the vehicle to the same temperature.

It is also an object of the invention to provide for directing currents of heated air to predetermined parts of the vehicle to perform specific functions.

The invention accordingly is disclosed in the embodiment thereof shown in the accompanying drawings and comprises the features of construction, combination of elements, and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawings, in which Figure 1 is a view in side elevation of the front of a vehicle with the frame cut away to show a heating system constructed in accordance with this invention.

Figure 2 is a view in side elevation showing doors for controlling the flow of air from the heating system.

Figure 3 is a view in vertical section of a latch for retaining a door in a predetermined position.

Figure 4 is a view in longitudinal section of a vehicle showing diagrammatically the paths followed by the currents of air as the heat is distributed through the vehicle by convection.

Figure 5 is a view in cross-section of a vehicle showing diagrammatically the paths taken by the currents of air as the heat is distributed, and Figure 6 is a view in cross-section of a vehicle provided with racks in the top showing diagrammatically how the heated air is distributed to heat the vehicle.

Referring now to the drawings, and Figure 1 in particular, the forward end of the motor vehicle illustrated comprises a frame 10 carrying a radiator 11 of any well known type suitable for service in a water cooling system for an internal combustion engine. The radiator is set back of a grating 12 in accordance with standard practice.

As illustrated, the radiator is connected into the water cooling system by pipes 13 and 14. The water is delivered to the radiator through the pipe 13 and manifold 15 which is provided to distribute the water and is returned to the engine through pipe 14.

In accordance with standard practice, a motor-driven fan 16 is provided to cooperate in circulating air through the radiator 11. The fan is located directly back of the radiator 11 to draw air inwardly and discharge it in the direction of the vehicle.

Inside the vehicle a housing or partition is provided which separates the mechanical parts from the remainder of the vehicle. This partition comprises the dash 17 and deck 18 which extends forward from the dash to the windshield 19.

It has been found that air discharged directly from the radiator of the water cooling system is not satisfactory for heating the vehicle. However, heat is absorbed by the air which flows through radiator 11 and this preheated air may be employed in heating the vehicle. In cooling systems provided with the conventional type of thermostatically controlled shutters, the volume of air flowing through the radiator 11 may change considerably with changes in atmospheric conditions but the temperature to which it is heated is always substantially the same.

In order to raise or control the temperature of the air circulated through the radiator of the conventional cooling system, a second or auxiliary radiator 20 is provided. As shown in Figure 1 the auxiliary radiator is connected in the conventional water cooling system in parallel relation with the water cooling radiator 11, both being disposed to receive water directly from the engine.

The radiator 20 is mounted on the dash 17 exterior of the passenger compartment, adjacent to, and nearly in line with the top portion of the radiator 11 in order to receive fresh uncontaminated air directly from the main radiator. A door 21 hinged to the dash along its lower horizontal edge is provided in alignment with the radiator 20 to admit air to the vehicle. Any suitable means may be employed for supporting the door 21 at different predetermined angles to the vertical, and in the embodiment illustrated a chain 22 is provided for supporting it at an angle of about 45° to the dash. When the door is set in this position currents of air impelled through the radiator by the fan 16 are directed upwardly as they enter the vehicle. A latch 30 is provided on the dash 17 for locking the door 21 closed.

The flow of water to the auxiliary radiator 20 may be controlled by any suitable type of valve. In the preferred embodiment two valves 23 and 24 are employed. The valve 23 is disposed in the connection between the pipe 13 and the radiator 20, while the valve 24 is in the connection between the radiator 20 and the return pipe 14 leading to the engine to be cooled. The engine may be of any conventional type and is not illustrated in the interest of simplicity in the drawings. As shown, the valve 24 is located near the pipe 14. The placing of valves 23 and 24 near the pipes 13 and 14 of the cooling system assures that there are no pockets in which hot water may collect when the radiator 20 is isolated from the conventional water cooling system in hot weather.

When it is desired to utilize the auxiliary radiator 20 for heating purposes, the valves 23 and 24 are opened. The extent to which these valves are opened will depend on the atmospheric conditions and the temperature to which the air discharged into the vehicle should be heated in order to raise the temperature in the vehicle to the proper degree for the comfort of the passengers. The temperature in the vehicle may also be regulated by controlling the volume of air admitted to the vehicle through the doors 21 and 25. Thus it will be seen that the opening of the door 25 will permit only such air as may be heated during transit through the main radiator 11 to enter the passenger compartment while the opening of the door 21 will permit entry of the air which has been additionally heated by radiator 20. Obviously, adjustment of the closures 21 and 25 will correspondingly regulate the heated air admitted to the passenger compartment of the vehicle.

Assuming now that the door 21 in the dash 17 is open, and that the vehicle is in operation, then a portion of the air drawn through the radiator 11 is forced directly through the auxiliary radiator 20. The air passing through the radiator 11 absorbs a certain amount of heat and may be said to be preheated, that is, its temperature has been raised above that of the atmosphere. This preheated air passes directly into the auxiliary radiator without having to pass through any conduits and without absorbing any engine fumes. The pure preheated air in passing through the auxiliary radiator, which due to its connection in the system is maintained at a high temperature, absorbs more heat and may be said to be superheated. In other words, the heating of the air delivered to the vehicle is effected in two stages.

The amount of heat delivered to the air as it passes through the auxiliary radiator 20 will depend on the atmospheric conditions and the temperature at which the air is delivered. The range through which the temperature of the air is raised in the radiator 20, may be varied by adjusting the valves 23 and 24, which control the volume of water that flows through the radiator 20 directly from the engine.

In such manner provision is made for heating a portion of the air circulating through the water cooling radiator to any desired temperature suitable for heating the vehicle under the existing atmospheric conditions. The adjusting of valves is a simple matter and may be taken care of by the driver of the vehicle. Access to the valve 23 may be had through the door 25.

In order to direct a current of air against the windshield 19 to prevent frosting, the door 25 is pivotally mounted in the deck 18. This door 25 is somewhat similar in shape to a cowl ventilator having side pieces depending therefrom which are triangular in shape. The door is hinged to the deck along the edge remote from the windshield and is in a position where it may be reached readily by the driver of the vehicle.

Two spring-biased latches 26 are disposed directly under the deck 18 in line with the forward end of the door 25. Openings 27 for receiving the latches 26 are provided in the side pieces carried by the door 25, one set of openings being provided in the side pieces near their lower edges, and the other pair near their upper edges. In this manner provision is made for latching the door in either its open or closed position.

In order to make a door structure which is light in weight, large openings 28 are cut in the side pieces of the door 25. These openings permit heated air to flow laterally thus distributing the air over the windshield 19.

When the windshield is being subjected to frosting, the door 25 is opened and warm air is directed against it. The air used for heating the windshield is first drawn through the radiator 11 and then caused to flow upwardly into contact with pipe 13 leading directly from the engine. When the air has been heated in this manner it is directed against the windshield by the door 25. This maintains the temperature of the windshield sufficiently high to prevent frosting.

As shown in Figure 2, the door 21 associated with the radiator 20 is so located that the hot air is not directed against the driver. The door 25 may be located in the center of the vehicle since this will not seriously interfere with the driver.

Air directed against the windshield 19 is directed upwardly toward the ceiling of the vehicle by the combined action of the door 25 and windshield. The air currents directed upwardly in this manner join the currents of heated air entering the vehicle through the door 21 and the whole volume of air is utilized for heating purposes.

It is well known that warm air in a room or vehicle tends to rise to the top. Therefore the currents of air delivered through the doors 21 and 25 rise to the top of the vehicle and flow rearwardly along the top as illustrated by arrows in Figures 4 and 5. As the volume of air in the top of the vehicle increases, gently moving currents are caused to flow directly downwardly also in the direction of the arrows in Figure 4 and 5. These currents are evenly distributed throughout the vehicle and they effect an even controlled heating of the vehicle.

In cases such as illustrated in Figure 6, where the vehicle is provided with luggage racks 29, the direction of flow of the currents of air is substantially the same as illustrated in Figures 4 and 5. A large volume of the heated air will flow in the space betwen the luggate racks and then downwardly. Air will also flow longitudinally of the vehicle beneath the luggage racks and then downwardly.

In the present heating system the air is heated to the desired temperature by the auxiliary radiator 20 and the circulation of the heated air in the vehicle is effected by the conventional radiator fan 16 and the pressure built up by the movement of the vehicle.

Having described my invention, what I claim as new and desire to secure by Letters Patent, is:

1. In a motor vehicle, a passenger compartment and a radiator compartment, a wall separating said compartments and having spaced openings formed therein, means normally closing said openings, a heating system including a main radiator arranged at the front of said radiator compartment, an auxiliary radiator positioned adjacent one of said openings and so constructed and arranged as to conduct air through said opening into the passenger compartment, and a fan for drawing air through said main radiator positioned between the radiators and forwardly of the openings whereby operation of one of the closures to open position will permit air drawn through the main radiator to be directed in a heated condition through one of the wall openings into the passenger compartment and the operation of the other closure to open position will permit air drawn through said main radiator to be forced into the passenger compartment through the auxiliary radiator and its associated opening.

2. In a motor vehicle, a passenger compartment and a radiator compartment, a wall separating said compartments and including substantially vertical and horizontal sections each formed with an opening therein, means normally closing said openings, a heating system including a main radiator arranged at the front of said radiator compartment, an auxiliary radiator positioned adjacent one of said openings and so constructed and arranged as to conduct air through said opening into the passenger compartment, and a fan for drawing air through said main radiator positioned between the radiators and forwardly of the openings whereby operation of one of the closures to open position will permit air drawn through the main radiator to be directed in a heated condition through one of the wall openings into the passenger compartment and the operation of the other closure to open position will permit air drawn through said main radiator to be forced into the passenger compartment through the auxiliary radiator and its associated opening.

3. In a motor vehicle, a passenger compartment and a radiator compartment, a wall separating said compartments and including substantially vertical and horizontal sections each formed with an opening therein, means normally closing said openings, a heating system including a main radiator arranged at the front of the radiator compartment, an auxiliary radiator positioned adjacent the opening formed in the vertical wall section and so constructed and arranged as to conduct air through said opening into the passenger compartment, and a fan for drawing air through said main radiator positioned between the radiators and forwardly of the openings whereby operation of one of the closures to open position will permit air drawn through the main radiator to be directed in a heated condition through the wall opening formed in the horizontal section into the passenger compartment and the operation of the other closure to open position will permit air drawn through said main radiator to be forced into the passenger compartment through the auxiliary radiator and the opening formed in the vertical wall section.

JAMES F. CHAPMAN.